(12) United States Patent
Schaede

(10) Patent No.: US 9,598,821 B2
(45) Date of Patent: Mar. 21, 2017

(54) SUBSTRATE FOR SECURITY PAPERS AND METHOD OF MANUFACTURING THE SAME

(71) Applicant: KBA-NOTASYS SA, Lausanne (CH)

(72) Inventor: Johannes Georg Schaede, Würzburg (DE)

(73) Assignee: KBA-NotaSys SA, Lausanne (CH)

( * ) Notice: Subject to any disclaimer, the term of this patent is extended or adjusted under 35 U.S.C. 154(b) by 46 days.

(21) Appl. No.: 14/767,179

(22) PCT Filed: Feb. 17, 2014

(86) PCT No.: PCT/IB2014/059052
§ 371 (c)(1),
(2) Date: Aug. 11, 2015

(87) PCT Pub. No.: WO2014/125454
PCT Pub. Date: Aug. 21, 2014

(65) Prior Publication Data
US 2015/0376841 A1  Dec. 31, 2015

(30) Foreign Application Priority Data
Feb. 15, 2013  (EP) ..................... 13155429

(51) Int. Cl.
*D21H 27/32* (2006.01)
*D21H 21/36* (2006.01)
(Continued)

(52) U.S. Cl.
CPC ............. *D21H 27/32* (2013.01); *B32B 3/266* (2013.01); *B32B 27/10* (2013.01); *B42D 25/324* (2014.10);
(Continued)

(58) Field of Classification Search
CPC ........ D21H 21/40; D21H 21/42; D21H 27/32; D21H 21/44; D21H 27/36; D21H 21/48;
(Continued)

(56) References Cited

U.S. PATENT DOCUMENTS

| 6,036,230 | A | 3/2000 | Färber | |
| 6,686,027 | B1 * | 2/2004 | Caporaletti | ............... B32B 7/02 283/72 |

(Continued)

FOREIGN PATENT DOCUMENTS

| CH | EP 1439076 A1 * | 7/2004 | ............. B41M 3/16 |
| CH | CA 2900189 A1 * | 8/2014 | ............. B32B 27/10 |

(Continued)

OTHER PUBLICATIONS

International Search Report for PCT/IB2014/059052, mailed Jun. 10, 2014, 4 pages.
(Continued)

*Primary Examiner* — Jose Fortuna
(74) *Attorney, Agent, or Firm* — Nixon & Vanderhye P.C.

(57) ABSTRACT

There is described a substrate (S) for security documents, such as banknotes, comprising one or more paper layers (11, 12) and a polymer layer (20) which is made to adhere to a side of at least one of the paper layers (11, 12), which polymer layer (20) is substantially transparent in at least one region of the substrate (S) which is not covered by the paper layer or layers (11, 12) so as to form a substantially transparent window (W) in the substrate (S) which is formed and closed by the polymer layer (20). The polymer layer (20) exhibits in the region of the window (W) a thickness (T) which is greater than a thickness (t) of the polymer layer (20) outside of the region of the window (W). The thickness (T) of the polymer layer (20) in the region of the window (W) is substantially equal to the added thickness of the paper layer or layers (11, 12) and of the polymer layer (20) outside of the region of the window (W) so that the substrate (S) exhibits a substantially uniform and constant thickness (T). The substrate (S) further comprises a micro-optical structure (30), in particular a lens structure, which is disposed in the
(Continued)

(A-A)

region of the window (W) on at least one side of the polymer layer (20).

20 Claims, 3 Drawing Sheets

(51) Int. Cl.
| | |
|---|---|
| B32B 27/10 | (2006.01) |
| B42D 25/351 | (2014.01) |
| D21H 21/44 | (2006.01) |
| B32B 3/26 | (2006.01) |
| D21H 27/36 | (2006.01) |
| B42D 25/425 | (2014.01) |
| B42D 25/324 | (2014.01) |
| D21H 21/40 | (2006.01) |
| D21H 21/42 | (2006.01) |
| G02B 3/00 | (2006.01) |

(52) U.S. Cl.
CPC ......... *B42D 25/351* (2014.10); *B42D 25/425* (2014.10); *D21H 21/40* (2013.01); *D21H 21/42* (2013.01); *D21H 21/44* (2013.01); *D21H 27/36* (2013.01); *B32B 2307/412* (2013.01); *B32B 2425/00* (2013.01); *B32B 2554/00* (2013.01); *G02B 3/0037* (2013.01)

(58) Field of Classification Search
CPC ...... D21H 25/06; B42D 25/29; B42D 25/351; B42D 2033/28; B42D 2035/20; B42D 25/45; B32B 2307/412; B32B 2554/00; B32B 27/10; B32B 2250/02; B32B 2305/347; B32B 2317/12; B32B 27/08; B32B 9/06; G02B 3/0037; B29K 2711/12; B29K 2995/0026; Y10S 428/916; Y10T 156/10; Y10T 428/24322; Y10T 428/31823

See application file for complete search history.

(56) References Cited

U.S. PATENT DOCUMENTS

| | | | | |
|---|---|---|---|---|
| 7,090,917 | B2* | 8/2006 | Puttkammer | D21H 21/48 283/72 |
| 8,027,093 | B2* | 9/2011 | Commander | B41M 3/148 359/619 |
| 8,144,399 | B2* | 3/2012 | Steenblik | G02B 27/2214 359/618 |
| 8,268,128 | B2* | 9/2012 | Henderson | D21F 1/44 162/140 |
| 8,310,760 | B2* | 11/2012 | Steenblik | B44F 1/06 359/619 |
| 8,608,080 | B2* | 12/2013 | Finn | B32B 37/1207 235/487 |
| 8,636,047 | B2 | 1/2014 | Eitel et al. | |
| 8,684,415 | B2* | 4/2014 | Commander | B42D 25/29 283/72 |
| 8,696,856 | B2 | 4/2014 | Eitel et al. | |
| 8,967,221 | B2 | 3/2015 | Eitel et al. | |
| 9,177,433 | B2* | 11/2015 | Holmes | B42D 25/351 |
| 2006/0124016 | A1* | 6/2006 | Schaede | B42D 25/29 101/494 |
| 2006/0198987 | A1 | 9/2006 | Grob et al. | |
| 2008/0212192 | A1* | 9/2008 | Steenblik | B44F 1/06 359/619 |
| 2008/0246894 | A1* | 10/2008 | Power | B42D 25/00 349/1 |
| 2008/0251222 | A1* | 10/2008 | Krietsch | D21H 21/40 162/110 |
| 2008/0296887 | A1* | 12/2008 | Baggenstos | B42D 25/00 283/109 |
| 2008/0309063 | A1 | 12/2008 | Zintzmeyer | |
| 2010/0024511 | A1 | 2/2010 | Eitel et al. | |
| 2010/0141881 | A1* | 6/2010 | Batistatos | B41M 3/14 349/124 |
| 2010/0165425 | A1* | 7/2010 | Tompkin | B44F 1/10 359/2 |
| 2010/0194093 | A1* | 8/2010 | MacPherson | B42D 25/355 283/94 |
| 2010/0308571 | A1* | 12/2010 | Steenblik | G02B 3/0031 283/72 |
| 2011/0017393 | A1 | 1/2011 | Eitel et al. | |
| 2011/0042025 | A1* | 2/2011 | Henderson | D21F 1/44 162/140 |
| 2011/0122499 | A1* | 5/2011 | Commander | B41M 3/148 359/626 |
| 2011/0130508 | A1* | 6/2011 | Pendley | C09J 175/04 524/507 |
| 2011/0139362 | A1 | 6/2011 | Eitel et al. | |
| 2011/0209328 | A1* | 9/2011 | Steenblik | B44F 1/06 29/428 |
| 2011/0259513 | A1 | 10/2011 | Eitel et al. | |
| 2013/0050818 | A1* | 2/2013 | Holmes | B42D 25/351 359/463 |
| 2013/0234426 | A1* | 9/2013 | Muller | B32B 3/08 283/82 |
| 2014/0060722 | A1* | 3/2014 | Finn | B32B 37/1207 156/73.1 |
| 2014/0151996 | A1* | 6/2014 | Camus | D21H 21/40 283/67 |
| 2014/0306441 | A1* | 10/2014 | Lister | G03C 5/08 283/85 |
| 2014/0319819 | A1* | 10/2014 | Power | C09D 11/037 283/85 |
| 2015/0061280 | A1* | 3/2015 | Power | G02B 5/1828 283/85 |
| 2015/0069748 | A1* | 3/2015 | Batistatos | G07D 7/0013 283/85 |
| 2015/0130179 | A1* | 5/2015 | Raymond | B42D 25/351 283/91 |
| 2015/0210106 | A1* | 7/2015 | Sun | B42D 25/29 283/85 |
| 2015/0298482 | A1* | 10/2015 | Walter | G02B 5/008 359/572 |
| 2015/0376841 | A1* | 12/2015 | Schaede | B32B 27/10 162/124 |
| 2016/0052326 | A1* | 2/2016 | Jolic | B41M 3/14 283/94 |
| 2016/0121640 | A1* | 5/2016 | Raymond | B42D 25/328 283/94 |
| 2016/0200088 | A1* | 7/2016 | Schaede | B32B 38/04 156/108 |
| 2016/0339653 | A1* | 11/2016 | Berthon | B29C 70/745 |

FOREIGN PATENT DOCUMENTS

| | | | | |
|---|---|---|---|---|
| CH | EP 2767395 A1 * | 8/2014 | ............ | B32B 27/10 |
| CH | WO 2014125454 A1 * | 8/2014 | ............ | B32B 27/10 |
| DE | WO 2007042131 A1 * | 4/2007 | ............ | D21H 21/40 |
| EP | 2 511 094 | 10/2012 | | |
| WO | WO 9510419 | 4/1995 | | |
| WO | WO 2005/116335 | 12/2005 | | |
| WO | WO 2006/066431 | 6/2006 | | |
| WO | WO 2007/020048 | 2/2007 | | |
| WO | WO 2008/104904 | 9/2008 | | |
| WO | WO 2009/112989 | 9/2009 | | |
| WO | WO 2010/001317 | 1/2010 | | |

OTHER PUBLICATIONS

Written Opinion of the ISA for PCT/IB2014/059052, mailed Jun. 10, 2014, 4 pages.

* cited by examiner (A-A)

(A-A)

(A-A)

(A-A)

(A-A)

SUBSTRATE FOR SECURITY PAPERS AND METHOD OF MANUFACTURING THE SAME

This application is the U.S. national phase of International Application No. PCT/IB2014/059052 filed 17 Feb. 2014, which designated the U.S. and claims priority to EP Patent Application No. 13155429.7 filed 15 Feb. 2013, the entire contents of each of which are hereby incorporated by reference.

TECHNICAL FIELD

The present invention generally relates to a substrate for security papers, in particular for banknotes and like high-security documents, and a method of manufacturing the same.

BACKGROUND OF THE INVENTION

A variety of substrate types are used in the high-security printing field, in particular for the production of banknotes, including (i) paper substrates which are typically made of cotton fibres, (ii) plastic or polymer substrates which are made of special polymer material (such as biaxially oriented polypropylene, or "BOPP") covered on both sides by white opacifying layers, as well as (iii) so-called hybrid or composite substrates combining paper and polymer materials or layers in one substrate medium.

A particular feature of polymer substrates, as for instance exemplified by the Australian Commemorative $10 banknote of 1988, resides in the provision of a transparent window formed by a region of the substrate where the white opacifying layers on both sides have been omitted to reveal a clear portion of the polymer material. This window portion is typically exploited to provide additional security by forming or applying features in the window such as embossings, printed patterns, and foil elements like optically-variable devices (OVDs).

Similar window features can be created in paper substrates and hybrid substrates provided the relevant paper layer(s) is/are provided with corresponding openings. In the case of hybrid substrates, the additional polymer layer can be exploited in order to close the window. In the case of paper substrates, the window-forming opening (which is produced e.g. by cutting) must typically be closed by a specific layer of material, such as foil material which is laminated on top of the window or otherwise embedded within the paper during manufacture. This process can be carried out at the paper mill or, more advantageously, at the printing works in accordance with the methods taught by International Patent Publications Nos. WO 2008/104904 A1, WO 2009/112989 A1 and WO 2010/001317 A1.

A potential problem with the paper-based window features resides in the fact that the opening in the paper layer(s) is prone to soiling and generates unevenness and non-uniformities in the substrate thickness which may affect processing and transport of the substrate through subsequent processing equipment. A solution is proposed in International Publication No. WO 2005/116335 A1 which consists in filling the opening with transparent filling material, but this solution requires additional processing steps, after application of the foil material intended to cover the region of the window. Furthermore, adequate bonding of the transparent filling material within the opening becomes a challenge with such a solution.

There is a further trend in the high-security printing industry which is to combine micro-optical structures, such as lens structures, with printed patterns which are provided underneath and in register with the micro-optical structures so as to create sophisticated dynamic and/or optically-variable effects. An example of such a combination between a lens structure and a printed pattern is for instance disclosed in International Publication No. WO 2007/020048 A2. As discussed in this publication, the dynamic and/or optically-variable effect is improved and optimized by maximizing the distance between the micro-optical structure and the printed pattern, namely by exploiting the entire thickness of the substrate material.

There is therefore a need for an improved substrate and a method of manufacturing the same.

SUMMARY OF THE INVENTION

A general aim of the invention is to improve the known substrates used for the production of security documents, in particular banknotes.

A further aim of the invention is to provide such a substrate that suitably incorporates a window-based micro-optical structure.

These aims are achieved thanks to the invention as defined in the claims.

Further advantageous embodiments of the invention form the subject-matter of the dependent claims and are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The present invention will be described in the particular context of an application of the substrate for the production of banknotes. It is to be understood however that the substrate of the invention can be used for the production of a variety of security documents, such as visas, passports or like identity or travel documents. It should be appreciated that the substrate of the invention can take any appropriate substrate shape suitable for treatment in printing and processing equipment as conventionally used for the production of security documents, namely be provided in the form of individual sheets or a continuous web. In the context of the present invention, the expression "substrate" therefore designates sheet or web material in any shape, including individual sheets or a continuous web as used for the production of security documents, as well as the substrate of individual documents produced from such sheets or web, such as individual banknotes.

Figure 1:
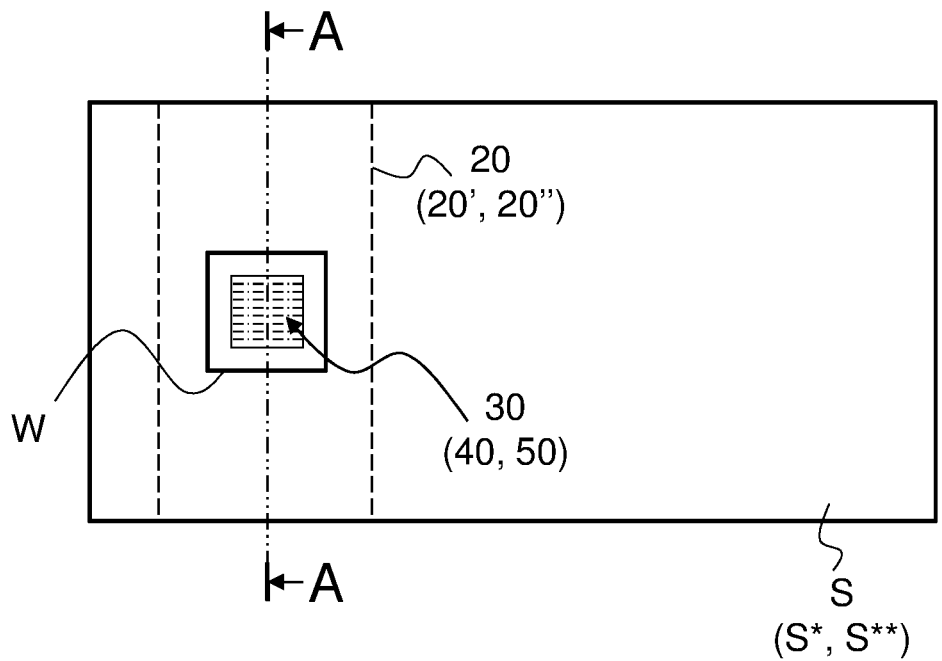
FIG. 1 is a schematic view of a security document in the form of a banknote, as viewed from a recto side thereof, comprising a substrate according to the invention and which generally illustrates first, second and third embodiments of the invention.

FIG. 1 hereof shows an individual security document in the form of a banknote comprising a substrate according to the invention. As is typical in the art, banknotes are produced in the form of individual sheets or successive portions of a continuous web, which sheets or portions carry a matrix arrangement of individual note positions, which are processed (i.e. cut) into individual documents at the end of the production process. It shall therefore be appreciated that the corresponding substrate in sheet or web form basically comprises multiple repetitions of the banknote substrate as depicted in FIG. 1.

FIG. 1 will be used to illustrate and describe first, second and third embodiments of the invention, the substrate being designated by reference S, S*, and S** respectively for the sake of distinguishing the embodiments. As shown in FIG. 1, the substrate S (S*, S**) exhibits a window portion W, i.e. a portion of the substrate material that is substantially transparent, at least in part. While FIG. 1 illustrates only one window, multiple windows of any desired shape could be provided.

As this will become apparent from reading the below description, the window is closed by a polymer layer designated by reference numeral 20 in the context of the first embodiment and by reference numerals 20' and 20" in the context of the second and third embodiments, respectively. This polymer layer can be made of any appropriate substantially transparent polymer material, such as biaxially oriented polypropylene (BOPP). The polymer layer can furthermore consist of a single homogenous layer of polymer material or of a laminate of two or more layers of polymer material.

The polymer layer 20 (20', 20") may extend only over a portion of the area of the substrate S (S*, S**), as schematically illustrated by the dashed lines in FIG. 1 which identify a strip of polymer material extending along the width of the banknote substrate S (S*, S**). The polymer layer could however take any other shape suitably covering at least the area of the window portion W, such as a patch shape. In the context of the invention, the polymer layer 20 (20', 20") could advantageously extend over the whole area of the substrate S (S*, S**), which simplifies manufacturing steps.

As further shown in FIG. 1, a micro-optical structure is formed in the region of the window W, which micro-optical structure is designated by reference numeral 30, 40 or 50 in the context of the first, second or third embodiment of the invention, respectively. This micro-optical structure 30 (40, 50) is preferably a lens structure, i.e. a structure comprising a multiplicity of individual lens elements such as semi-cylindrical or hemispherical lens elements. For the sake of illustration, it will be assumed that the micro-optical structure 30 (40, 50) consists in this example of multiple semi-cylindrical lens elements which are oriented horizontally in FIG. 1. Other micro-optical structures are possible, such as Fresnel lens structures or even more complex structures. In the context of the invention, the expression "micro-optical structure" should be understood as referring to any non-planar surface in or on the surface of the substrate S (S*, S**) and which provides or creates an optical change in appearance when looking through the non-planar surface in question. The micro-optical structure 30 (40, 50) may extend over only part or all of the region of the window W or even beyond the boundaries of the window W depending on design choices and the manner in which the micro-optical structure 30 (40, 50) is formed on the substrate S (S*, S**).

Figure 2:
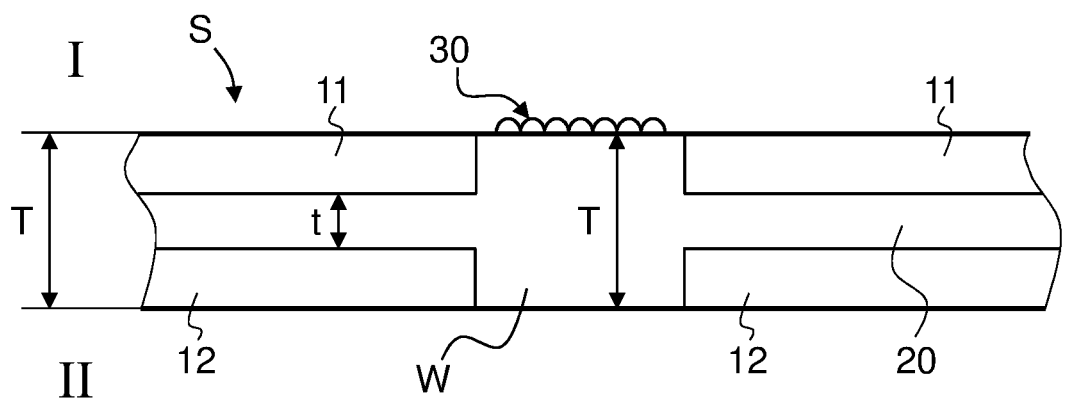
FIG. 2 is a schematic cross-section of the banknote of FIG. 1, taken along line A-A, according to a first embodiment of the invention.

Turning to FIG. 2, which illustrates a first embodiment of the invention, there is shown a cross-section of the banknote of FIG. 1 taken along line A-A, through the substrate S and window region W, where the polymer layer 20 and micro-optical structure 30 are visible. As schematically illustrated, the polymer layer 20 exhibits, in the window-forming portion W, a thickness T (preferably of the order of 100 μm) which is greater than the thickness t of the polymer layer 20 outside of the region of the window W. As further illustrated in FIG. 2, first and second paper layers 11, 12 are provided on each side of the polymer layer 20, which paper layers 11, 12 do not cover the region of the window W. In other words, the polymer layer 20 is sandwiched between the first and second paper layers 11, 12 and exhibits, in the region of the window W, portions protruding in the direction of both sides I, II of the substrate S.

As depicted in FIG. 2, the thickness T of the polymer layer 20 in the region of the window W is substantially equal to the added thickness of the paper layers 11, 12 and of the polymer layer 20 outside of the region of the window W. In this way, the substrate S exhibits a substantially uniform and constant thickness T, it being understood that the thickness of the micro-optical structure 30 is not taken into consideration.

For the sake of illustration, the micro-optical structure 30 in the region of the window W is pre-embossed directly onto the side of the polymer layer 20, namely on the side coinciding with the upper side I of the substrate S. In other words, according to this first embodiment, the micro-optical structure 30 is an integral part of the polymer layer 20. The micro-optical structure could however be formed or applied other than by direct embossing of the polymer layer, as this will become apparent from the description of the second and third embodiments.

Figure 3:
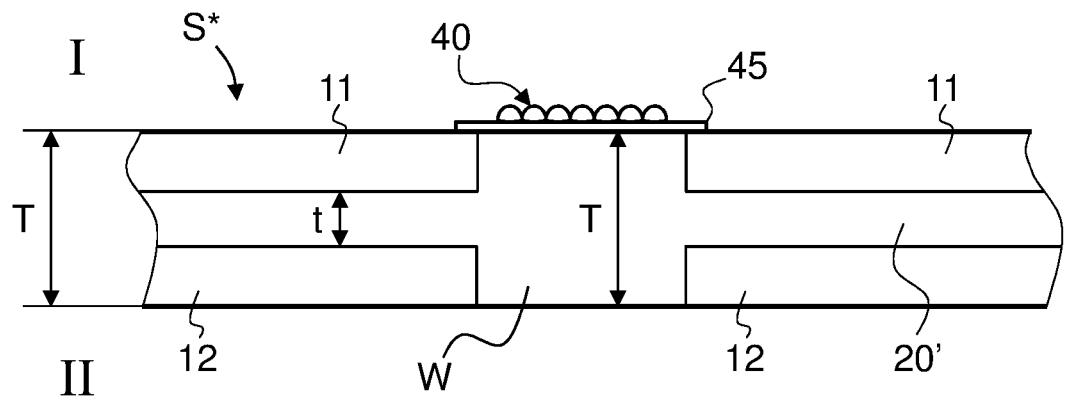
FIG. 3 is a schematic cross-section of the banknote of FIG. 1, taken along line A-A, according to a second embodiment of the invention.

FIG. 3 shows a cross-section of the banknote of FIG. 1, along the same line A-A, according to a second embodiment of the invention. For the sake of distinction, the substrate is designated by reference S* in this other example. The second embodiment shown in FIG. 3 differs from the first embodiment illustrated in FIG. 2 in that the micro-optical structure, designated by reference numeral 40, is pre-embossed onto a side of a foil element 45 which is applied, preferably by hot-stamping, onto the side of the polymer layer, designated by reference numeral 20'.

Figure 4:
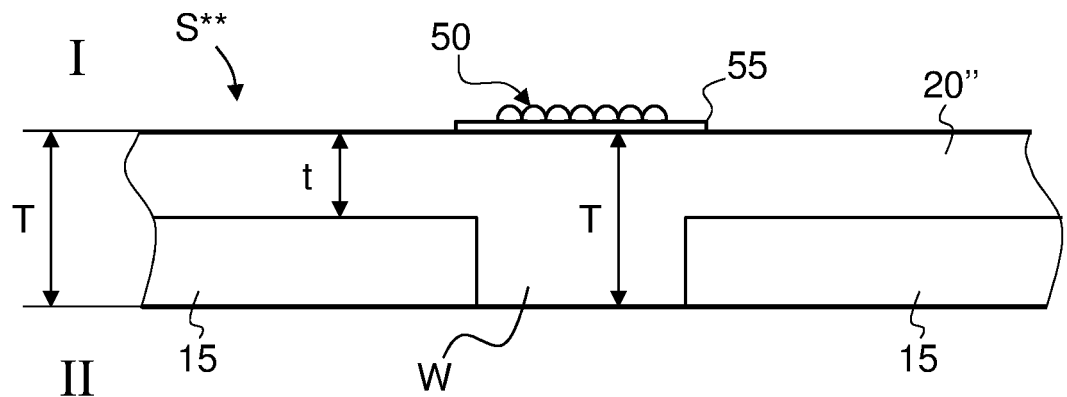
FIG. 4 is a schematic cross-section of the banknote of FIG. 1, taken along line A-A, according to a third embodiment of the invention.

FIG. 4 shows a cross-section of the banknote of FIG. 1, along line A-A, according to a third embodiment of the invention. This other embodiment differs from the previous embodiments described above in that the polymer layer 20" is exposed on one side (namely the upper side I in this example) of the substrate, designated by reference S**, and exhibits a substantially flat surface along this side I. A paper layer 15 is provided on the other side of the polymer layer 20" where a protruding portion is formed in the region of the window W. Like the paper layer 12 of the embodiments of FIGS. 2 and 3, the paper layer 15 is provided on the lower side of the polymer layer 20" so as not cover the region of the window W.

The thickness T of the polymer layer 20" in the region of the window W is again substantially equal to the added thickness of the paper layer 15 and of the polymer layer 20"

outside of the region of the window W, thereby resulting in a substrate S** exhibiting a substantially uniform and constant thickness T.

The micro-optical structure, designated by reference numeral 50 in this third embodiment, is formed by embossing of a side of a layer of material 55 (for instance a printed layer) which is applied, preferably prior to embossing, onto the side of the polymer layer 20". It is however to be appreciated that the micro-optical structure 50 could be pre-embossed directly onto a side (upper or lower side) of the polymer layer 20" (like in the first embodiment) or be pre-embossed onto a side of a foil element which is applied, preferably by hot-stamping, onto the side of the polymer layer 20" (like in the second embodiment).

It may be convenient to further apply an opacifying layer on top of the polymer layer 20" of FIG. 3 (except in the region of the window W) as in the case of the known polymer substrates.

It is worth noting that the first and second paper layers 11, 12 of the embodiments of FIGS. 2 and 3 and the paper layer 15 of the embodiment of FIG. 4 could each consist of a single paper layer or of a laminate of multiple layers including at least one paper layer.

As illustrated by the above-described embodiments, an advantage of the substrate of the invention resides in that the substrate exhibits a substantially uniform and constant thickness, especially in the region of the window, thereby avoiding soiling issues. In addition, the polymer layer 20 (20', 20") in the region of the window W forms a substantially uniform and flat region enhancing the optical effect of the micro-optical structure 30 (40, 50). The window-forming portion of the polymer layer 20 (20', 20") is in particular advantageous in that it provides adequate support for printing a pattern on the side of the substrate S (S*, S**) opposite to the side where the micro-optical structure 30 (40, 50) is located, thereby producing an optimal optically-variable effect when observing the window W from the upper side I of the substrate S (S*, S**).

Figure 5:
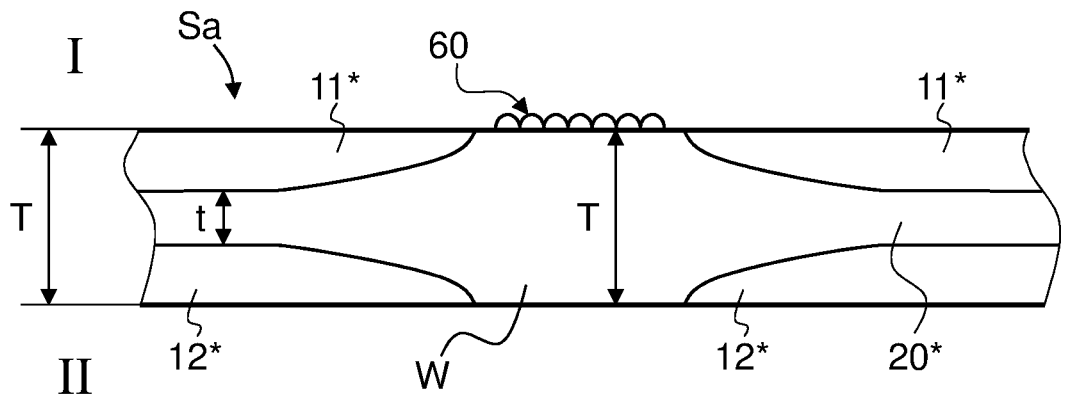
FIG. 5 is a schematic cross-section of a banknote in accordance with a fourth embodiment of the invention.
Figure 6:
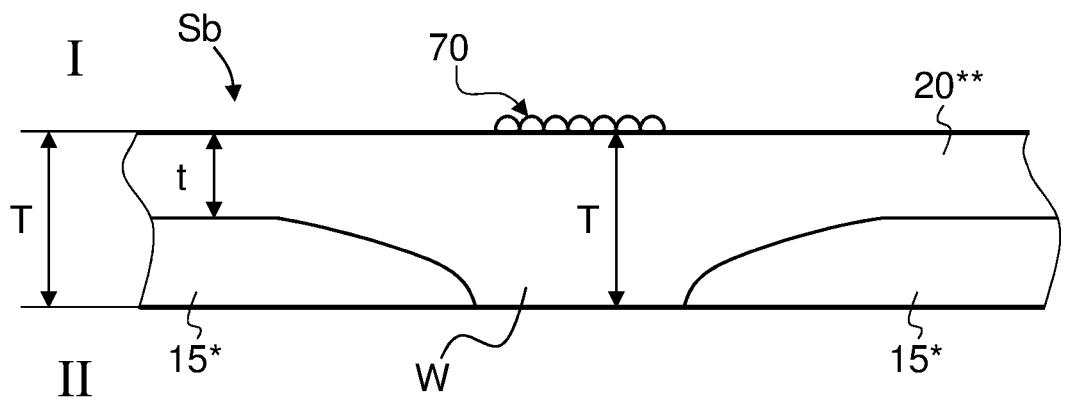
FIG. 6 is a schematic cross-section of a banknote in accordance with a fifth embodiment of the invention.

FIGS. 5 and 6 illustrate further embodiments of the invention highlighting that the polymer layer, designated by reference numeral 20*, resp. 20**, can exhibit a smooth thickness transition to the to the region of the window W, namely a smooth transition between the thick region of the polymer layer 20*, 20** forming the window W and the thinner region of the polymer layer 20*, 20**, outside of the region of the window W. The paper layers 11*, 12* in FIG. 5 and the paper layer 15* in FIG. 6 similarly exhibit a gradually decreasing thickness as one moves towards the region of the window W.

The micro-optical structures 60, 70 depicted in FIGS. 5, 6 are similar to the micro-optical structure 30 of FIG. 2. These micro-optical structures 60, 70 could alternatively be formed as in the alternative examples of FIGS. 3 and 4.

As far as the manufacture of the substrate is concerned, the method necessitates:

a) the provision of a polymer layer comprising at least one window-forming portion which exhibits a thickness which is greater than a thickness of the polymer layer outside of the window-forming portion;

b) the provision of one or more paper layers in such a manner that the polymer layer is made to adhere to a side of at least one of the paper layers and that the resulting substrate exhibits a substantially uniform and constant thickness; and c) providing a micro-optical structure on at least one side of the window-forming portion of the polymer layer.

Techniques known as such in the art can be applied to ensure proper bonding and adhesion of the polymer layer onto the paper layer(s).

Various modifications and/or improvements may be made to the above-described embodiments without departing from the scope of the invention as defined by the annexed claims. In particular, as already mentioned, the invention is not limited to any particular substrate shape, but is preferably produced in the form of individual sheets or of a continuous web.

LIST OF REFERENCE NUMERALS USED THEREIN (IF ANY)

S substrate, e.g. banknote or banknote sheet (first embodiment)
S* substrate, e.g. banknote or banknote sheet (second embodiment)
S** substrate, e.g. banknote or banknote sheet (third embodiment)
Sa substrate, e.g. banknote or banknote sheet (fourth embodiment)
Sb substrate, e.g. banknote or banknote sheet (fifth embodiment)
W window/window-forming portion of polymer layer 20, 20' or 20"
I first (upper) side of substrate S, S*, S**
II second (lower) side of substrate S, S*, S**
11 first (upper) paper layer (first and second embodiments)
12 second (lower) paper layer (first and second embodiments)
11* first (upper) paper layer (fourth embodiment)
12* second (lower) paper layer (fourth embodiment)
15 (lower) paper layer (third embodiment)
15* (lower) paper layer (fifth embodiment)
20 polymer layer (first embodiment)
20' polymer layer (second embodiment)
20" polymer layer (third embodiment)
20* polymer layer (fourth embodiment)
20** polymer layer (fifth embodiment)
30 micro-optical structure, e.g. lens structure, pre-embossed on window-forming portion W of polymer layer 20 (first embodiment)
40 micro-optical structure, e.g. lens structure (second embodiment)
45 foil element carrying pre-embossed micro-optical structure 40
50 micro-optical structure, e.g. lens structure (third embodiment)
55 layer (e.g. printed layer) applied onto window-forming portion W of polymer layer 20" and subsequently embossed to form micro-optical structure 50
60 micro-optical structure, e.g. lens structure (fourth embodiment)
70 micro-optical structure, e.g. lens structure (fifth embodiment)
T thickness of substrate S, S*, S** and of window-forming portion W of polymer layer 20, 20', 20"
t thickness of polymer layer 20, 20', 20" outside of the window-forming portion W

The invention claimed is:

1. A substrate for security documents comprising one or more paper layers and a polymer layer which is made to adhere to a side of at least one of the paper layers, which polymer layer is substantially transparent in at least one region of the substrate which is not covered by the paper layer or layers so as to form a substantially transparent window in the substrate which is formed and closed by the polymer layer, wherein the polymer layer exhibits in the region of the window (W) a thickness which is greater than a thickness of the polymer layer outside of the region of the window, wherein the thickness of the polymer layer in the region of the window is substantially equal to the added thickness of the paper layer or layers and of the polymer layer outside of the region of the window (W) so that the substrate exhibits a substantially uniform and constant thickness, and wherein the substrate further comprises a micro-optical structure, which is disposed in the region of the window on at least one side of the polymer layer.

2. The substrate according to claim 1, wherein the polymer layer extends over the whole area of the substrate.

3. The substrate according to claim 1, wherein the polymer layer extends only over a portion of the area of the substrate.

4. The substrate according according to claim 3, wherein the polymer layer has the shape of a strip or patch of polymer material.

5. The substrate according to claim 1, wherein the polymer layer is sandwiched between at least first and second paper layers and exhibits, in the region of the window, portions protruding in the direction of both sides of the substrate.

6. The substrate according to claim 1, wherein the polymer layer is exposed on a first side of the substrate and exhibits along this first side a substantially flat surface.

7. The substrate according to claim 1, wherein the micro-optical structure in the region of the window is pre-embossed directly onto the side of the polymer layer.

8. The substrate according to claim 1, wherein the micro-optical structure in the region of the window is pre-embossed onto a side of a foil element which is applied onto the side of the polymer layer.

9. The substrate according to claim 8, wherein the foil element is applied by hot-stamping onto the side of the polymer layer.

10. The substrate according to claim 1, wherein the micro-optical structure in the region of the window is formed by embossing of a side of a layer of material which is applied onto the side of the polymer layer.

11. The substrate according to claim 10, wherein the layer of material is applied onto the side of the polymer layer by printing.

12. The substrate according to claim 1, wherein the thickness of the substrate and of the polymer layer in the region of the window is of the order of 100 µm.

13. The substrate (Sa; Sb) according to claim 1, wherein the polymer layer exhibits a smooth thickness transition to the region of the window.

14. The substrate according to claim 1, wherein the micro-optical structure is a lens structure.

15. A method of manufacturing the substrate of claim 1, comprising the step of:
a) providing at least one polymer layer comprising at least one window-forming portion which exhibits a thickness which is greater than a thickness of the polymer layer outside of the window-forming portion;
b) providing one or more paper layers in such a manner that the polymer layer is made to adhere to a side of at least one of the paper layers and that the resulting substrate exhibits a substantially uniform and constant thickness; and
c) providing a micro-optical structure, in particular a lens structure, on at least one side of the window-forming portion of the polymer layer.

16. The method according to claim 15, wherein the micro-optical structure is pre-embossed directly onto the side of the window-forming portion of the polymer layer.

17. The method according to claim 15, wherein the micro-optical structure is pre-embossed onto a side of a foil element which is applied onto the side of the window-forming portion of the polymer layer.

18. The method according to claim 17, wherein the foil element is applied by hot-stamping onto the side of the window-forming portion of the polymer layer.

19. The method according to claim 15, wherein the micro-optical structure is formed by embossing of a side of a layer of material which is applied onto the side of the window-forming portion of the polymer layer.

20. The method according to claim 15, wherein the thickness of the substrate and of the window-forming portion (W) of the polymer layer is of the order of 100 µm.

* * * * *